(12) United States Patent
Williams et al.

(10) Patent No.: US 9,846,600 B1
(45) Date of Patent: *Dec. 19, 2017

(54) SYSTEM AND METHOD TO DYNAMICALLY ALLOCATE VARYING PROCESSING CAPACITY ENTITLEMENTS BASED ON WORKLOAD IMPORTANCE

(71) Applicant: BMC SOFTWARE, INC., Houston, TX (US)

(72) Inventors: Edward Williams, North Las Vegas, NV (US); Steven DeGrange, Saratoga, CA (US); Hemanth Rama, Fremont, CA (US); Robert Perini, Ashburn, VA (US)

(73) Assignee: BMC Software, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/452,309

(22) Filed: Mar. 7, 2017

Related U.S. Application Data

(63) Continuation of application No. 15/262,723, filed on Sep. 12, 2016.

(51) Int. Cl.
*G06F 9/50* (2006.01)
*G06F 9/455* (2006.01)

(52) U.S. Cl.
CPC ............ *G06F 9/5038* (2013.01); *G06F 9/505* (2013.01); *G06F 9/5077* (2013.01); *G06F 9/45533* (2013.01); *G06F 9/5083* (2013.01); *G06F 2209/504* (2013.01); *G06F 2209/5022* (2013.01); *Y02B 60/167* (2013.01)

(58) Field of Classification Search
None
See application file for complete search history.

(56) References Cited

U.S. PATENT DOCUMENTS

| 7,096,469 B1 * | 8/2006 | Kubala | G06F 9/5077 |
| | | | 718/100 |
| 7,752,415 B2 * | 7/2010 | Vaupel | G06F 9/5077 |
| | | | 711/173 |

(Continued)

*Primary Examiner* — Abu Ghaffari
(74) *Attorney, Agent, or Firm* — Brake Hughes Bellermann LLP

(57) ABSTRACT

A mainframe computing system hosts a plurality of logical partitions, each having a static entitlement of processing capacity. The mainframe computer system has a workload manager that schedules work requested by the logical partitions and tracks consumption of the processing capacity by the logical partitions, and a capping policy that is stored in non-transitory memory and which identifies a subset of the logical partitions. The mainframe computer system further includes a capping master that is configured to allocate dynamically varying entitlements of processing capacity to the subset of the logical partitions based on the high-importance work percentages of computing workloads running on the logical partitions to encourage completion of high-importance work over completion of low-importance work. The capping master limits the allocated dynamic entitlement amount in millions of service units per hour (MSU) for each system usage entity to be no greater than the static entitlement of the system usage entity.

23 Claims, 9 Drawing Sheets

(56) References Cited

U.S. PATENT DOCUMENTS

| | | | | |
|---|---|---|---|---|
| 8,230,434 | B2* | 7/2012 | Armstrong | G06F 9/5077 713/1 |
| 8,904,405 | B1* | 12/2014 | Peeters | G06F 9/5077 718/104 |
| 2008/0022284 | A1* | 1/2008 | Cherkasova | G06F 9/4881 718/104 |
| 2012/0290725 | A1* | 11/2012 | Podila | G06F 9/5011 709/226 |
| 2012/0304191 | A1* | 11/2012 | Morgan | G06F 9/5088 718/105 |
| 2013/0081039 | A1* | 3/2013 | Glew | G06F 9/5011 718/103 |
| 2013/0091282 | A1* | 4/2013 | Tontiruttananon | G06F 9/5061 709/226 |
| 2013/0111491 | A1* | 5/2013 | Glew | G06F 11/30 718/104 |
| 2013/0179574 | A1* | 7/2013 | Calder | G06F 9/5033 709/226 |
| 2013/0346969 | A1* | 12/2013 | Shanmuganathan | G06F 9/4856 718/1 |
| 2014/0244841 | A1* | 8/2014 | Gulati | G06F 9/5072 709/226 |
| 2014/0245311 | A1* | 8/2014 | Dodge | G06F 9/50 718/103 |
| 2014/0281348 | A1* | 9/2014 | Nayar | G06F 12/02 711/173 |
| 2015/0067696 | A1* | 3/2015 | Peeters | G06F 9/505 718/105 |
| 2017/0199564 | A1* | 7/2017 | Saxena | G06F 1/3296 |

* cited by examiner

Policy Name: DYCWLMPB  Activated  11:29
MSU Limit: 400                      05APR2014

Dynamic Entitlements? Yes/No

Peak 4HRA: 395                Peak Time: 05APR2014 13:43

| LPAR or Group | T | Proportion | Static Entitlement Cost | MSU Entitlement Cost | Cost Entitlement | Priority | Low-Imp Wkld% | Adj Low Imp Wkld% | 4HRA | DefCap or GCL | Min (4HRA, DC\|GCL) | % MSU Limit |
|---|---|---|---|---|---|---|---|---|---|---|---|---|
| DB2GROUP | G | 183 | 73 | 10 | 730 | 2 | 79 | 63 | 93 | 93 | 93 | 23.2 |
| DEFAULT | G | 157 | 63 | 15 | 945 | 3 | 82 | 82 | 80 | 80 | 80 | 20.0 |
| INSA | L | 59 | 21 | 5 | 105 | 4 | 49 | 58 | 5 | 7 | 5 | 1.2 |
| SJSC | L | 52 | 21 | 7 | 147 | 2 | 79 | 63 | 42 | 42 | 42 | 10.5 |
| SJTEST2 | G | 555 | 222 | 20 | 4440 | 1 | 88 | 52 | 175 | 178 | 175 | 43.7 |
| *Policy | T | | | | | | | | 395 | 395 | 395 | 98.6 |

FIG. 5

SYSTEM AND METHOD TO DYNAMICALLY ALLOCATE VARYING PROCESSING CAPACITY ENTITLEMENTS BASED ON WORKLOAD IMPORTANCE

CROSS REFERENCE TO RELATED APPLICATION

This application is a continuation of U.S. application Ser. No. 15/262,723, filed Sep. 12, 2016, entitled "DYNAMICALLY VARYING PROCESSING CAPACITY ENTITLEMENTS," the contents of which are hereby incorporated by reference in their entirety herein.

BACKGROUND

Mainframe computers are powerful, multi-processor computing devices that have high throughput and are able to perform thousands of computing tasks every second. Processing capacity of the mainframe computers is often measured in terms of millions of service units per hour (MSUs) that are used to execute the computing tasks A logical partition, commonly called an LPAR, is a subset of a computer's hardware resources (e.g., processors, memory, and storage), virtualized as a separate computer. In effect, a physical mainframe computer can be partitioned into multiple logical partitions, each hosting a separate operating system instance. A mainframe computer may support one or more LPARs for computing work. Many applications may be run or executed concurrently on an LPAR.

Enterprises and organizations often rely on mainframe computers for their computing needs, for example, for critical applications, bulk data processing such as census, industry and consumer statistics, enterprise resource planning, and transaction processing. Instead of maintaining their own mainframe computer installations, the enterprises and organizations (hereinafter "mainframe customers") may get a license to use processing capacity on a mainframe computer installations maintained by an external provider or vendor.

Under common license arrangements (e.g. IBM's Monthly License Charge (MLC)), a mainframe customer may obtain a license to use a limited amount of processing capacity on one or more logical partitions (LPARs) of the mainframe computers to run the customer's applications or software. The licensed processing capacity, which may be measured in terms MSUs, may be a function of the individual LPAR, time of use, etc. The licensed processing capacity may, for example, be a "Defined Capacity" (DC) for an individual LPAR or a "Group Capacity" (GCL) for a group of LPARs. The licensed processing capacity may include a maximum or total capacity limit for the computer system across all LPARs.

The customer may run several applications ("computing workload") on each LPAR concurrently. The customer may use a capping product or solution (e.g., a third party capping product or solution) to manage distribution and execution of the customer's computing workload on the mainframe computers within the processing capacity limits. The processing capacity limits are usually enforced by the capping product or solution on a rolling average basis allowing instantaneous workload demand to exceed the processing capacity limits. Consideration is now being given to managing capping limits on CPU usage of one or more LPARs, while optimizing capacity usage across the LPARs by aligning workload allocations based on utilization needs, workload importance, and customer policy profiles.

SUMMARY

A method for running computing workloads on a group of system usage entities (e.g., LPARs or capacity groups) of a mainframe computer system in which processing capacity availability is limited is described herein. The processing capacity may be measured in millions of service units per hour (MSUs). Each system usage entity has a fixed or static processing capacity entitlement for running a computing workload thereon. The computing workload may have different portions of work corresponding to different importance levels. The method redistributes or allocates processing capacity amongst the system usage entities to encourage completion of high importance work preferentially over completion of low importance work.

In an aspect, the method includes, for each system usage entity, determining consumption of processing capacity by the different portions of work corresponding to different importance levels in the computing workload running thereon, and determining a four-hour rolling average (4HRA) of processing capacity consumption by each system usage entity.

In a further aspect, the method includes allocating a dynamic entitlement MSU amount for each system usage entity to be the greater of (1) all the MSUs that the system usage entity needs to complete high importance work, and (2) a predetermined fraction of the 4HRA of the system usage entity; and In a further aspect, the method includes using the allocated dynamic entitlements as capping limits in conjunction with a capping product or solution for regulating processing capacity consumption by the system usage entities when running their respective computing workloads.

The details of one or more implementations are set forth in the accompanying drawings and the description below. Other features will be apparent from the description and drawings, and from the claims.

BRIEF DESCRIPTION OF THE DRAWINGS

FIG. 5 is schematic illustration of an example user interface for maintaining a dynamic capping policy in the system of FIG. 4, in accordance with the principles of the present disclosure.

DETAILED DESCRIPTION

Figure 1A:
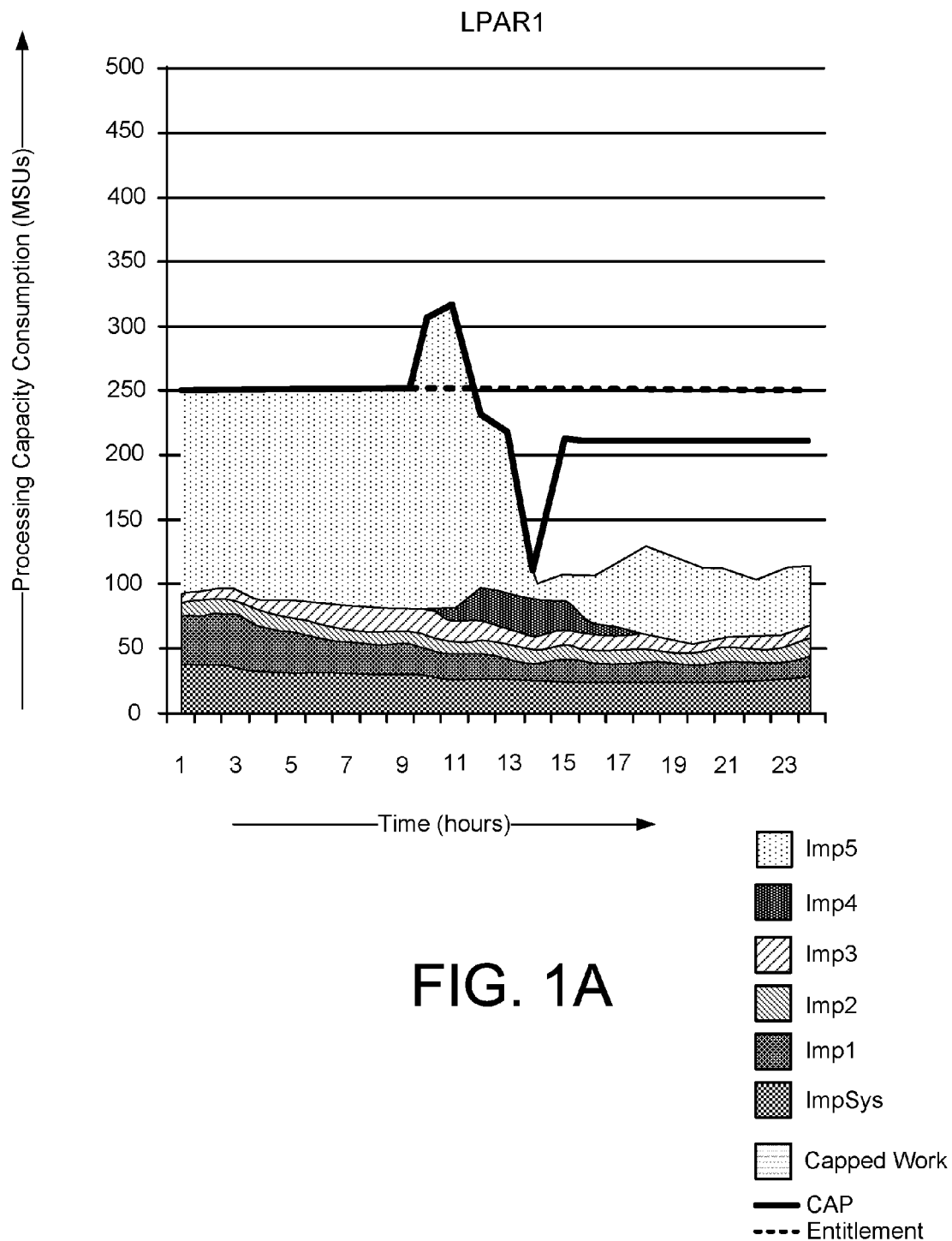
FIGS. 1A, 1B and 1C are processing capacity consumption-versus-time graphs, which illustrate the effect of DC and fixed or static entitlement capping on computing workloads running on three different LPARs, respectively, over about a 24-hour time period in a test on a computer system.

An LPAR is a logical segmentation of a mainframe computer system's memory and other resources that allows the LPAR to run its own copy of an operating system and associated applications, making the LPAR, in practice, equivalent to a separate mainframe computer. LPARs may be enabled via special hardware circuits or purely through software. A system administrator can assign one or more processors of the mainframe computer system for the exclusive use of an LPAR. Alternately, the system administrator can allow all processors to be used on some or all LPARs. LPARs may also allow multiple system images (of the same operating system or different operating systems) to run in one machine. Furthermore, each LPAR can execute one or more subsystems within an operating system. A user may group two or more LPARs into a capacity group. All LPARs in a capacity group must be on the same physical machine. The LPARs may be part of a Systems Complex (SYSPLEX). The LPARs of the SYSPLEX may be a collection of LPARs that cooperate to process work. The LPARs in a SYSPLEX may communicate with a specialized communications component (e.g., XCF). The LPARs in a SYSPLEX need not be located on the same physical device or machine.

For convenience in description herein, the term "system usage entity" may be used to refer to an LPAR, a capacity group of LPARs or a SYSPLEX collection of LPARs.

A customer may have been granted or licensed use of a system usage entity (e.g., an LPAR, a capacity group of LPARs) on a mainframe computer system up to a specific processing capacity limit (e.g., a Defined Capacity (DC)) for each LPAR, and a specific processing capacity limit (e.g., a Group Capacity Limit (GCL)) for each LPAR capacity group, etc. The processing capacity limit may be measured in terms of MSUs. For convenience in description, the term "capacity limit" may be used herein to refer to either a DC or a GCL.

The customer may run a computing workload (e.g., applications or software) on a system usage entity of the mainframe computer system. The computing workload may include diverse workload portions (e.g., applications) having different relative importance. The importance levels of different portions of the current computing workload may be user-assigned, for example, on a scale of 1 to 5 in descending order of importance with importance level 1 being the most important level and 5 being the least important level. In some implementations, workload portions with even less importance than importance level 5 may be designated as having a "discretionary" importance level. The user-assigned importance levels may be recorded, for example, with a workload manager (WLM) component of the mainframe computer system.

Execution of the customer's computing workload may be controlled, managed or regulated by the WLM component of the mainframe computer system in view of the capacity limit (e.g., DC or GCL) granted to the system usage entity. The availability of additional (instantaneous) processing capacity to the system usage entity on the mainframe computer system may be capped when processing capacity consumption (measured, for example, as a 4-hour rolling average (4HRA)) by the system usage entity exceeds the capacity limit. The capping may be lifted and availability of additional processing capacity to the system usage entity restored only after the 4HRA falls below the capacity limit. Capping prevents further growth of the customer's computing workload on the system usage entity by limiting processing capacity availability and, thus, delays execution of the customer's computing workload.

Static or Fixed Capacity Entitlement Schemes

Further, in managing execution of the computing workload on the mainframe (using a capping product or solution) from the customer's perspective, the customer may allocate a limited number of MSUs (hereinafter referred to as capacity "entitlement") to each system usage entity for running the computing workload. This entitlement, which is fixed or static, may be viewed as a customer-defined capacity limit for a system usage entity. In addition, to capping the customer's computing workload at DC or GCL on a system usage entity, a capping product or solution for mainframe workload management may cap availability of processing capacity for the customer's computing workload at the fixed or static entitlement of the system usage entity. If a group of system usage entities are being managed, the capping product or solution may transfer excess or unused MSUs capacity (i.e. unused static entitlements) if available from other system usage entities in the group to the entitlement-capped system usage entity to execute at least some of the otherwise delayed or capped computing workload.

Traditional capping products and solutions for mainframe workload capping tend to be rather static at least in the sense that they do not take into account the changing nature of customer's computing workload or the relative importance of different portions or applications in the computing workload. The capping products and solutions release processing capacity based on static values (entitlements) that do not take into account the different importance levels of different work. The capping products and solutions may be performance oriented with emphasis on getting all work done rather than getting the most important work done quickly. However, some customers may tolerate delays in the performance of less important work so that the most important work can be completed in a required timeframe.

Further, while a traditional capping product or solution may guarantee that every LPAR or CG (capacity group) is entitled to a specified amount of MSUs to do their work, capping at the fixed or static entitlement values often results in important work (or applications) on one LPAR not being executed or being delayed because of hitting the entitlement limit. The more important work on the one LPAR can be delayed even while another LPAR may be executing less important work. Furthermore, because of the static or fixed nature of entitlements, with the traditional capping product or solution, LPARs with a high percentage of high importance work are unlikely to get additional MSUs in excess of their entitlement. Thus, on such LPARs high importance work may run behind of low importance work on other LPARs.

With static or fixed capacity entitlements, LPARs with high percentages of high importance work are capped because no more MSUs above the entitlement MSUs can be given out to them. With static or fixed capacity entitlement designs, even if an LPAR has a 100% high importance workload, the most MSUs the LPAR can get is the capped capacity limit i.e. DC=4HRA, when the rolling average reaches the specified capacity limit.

Figure 1B:
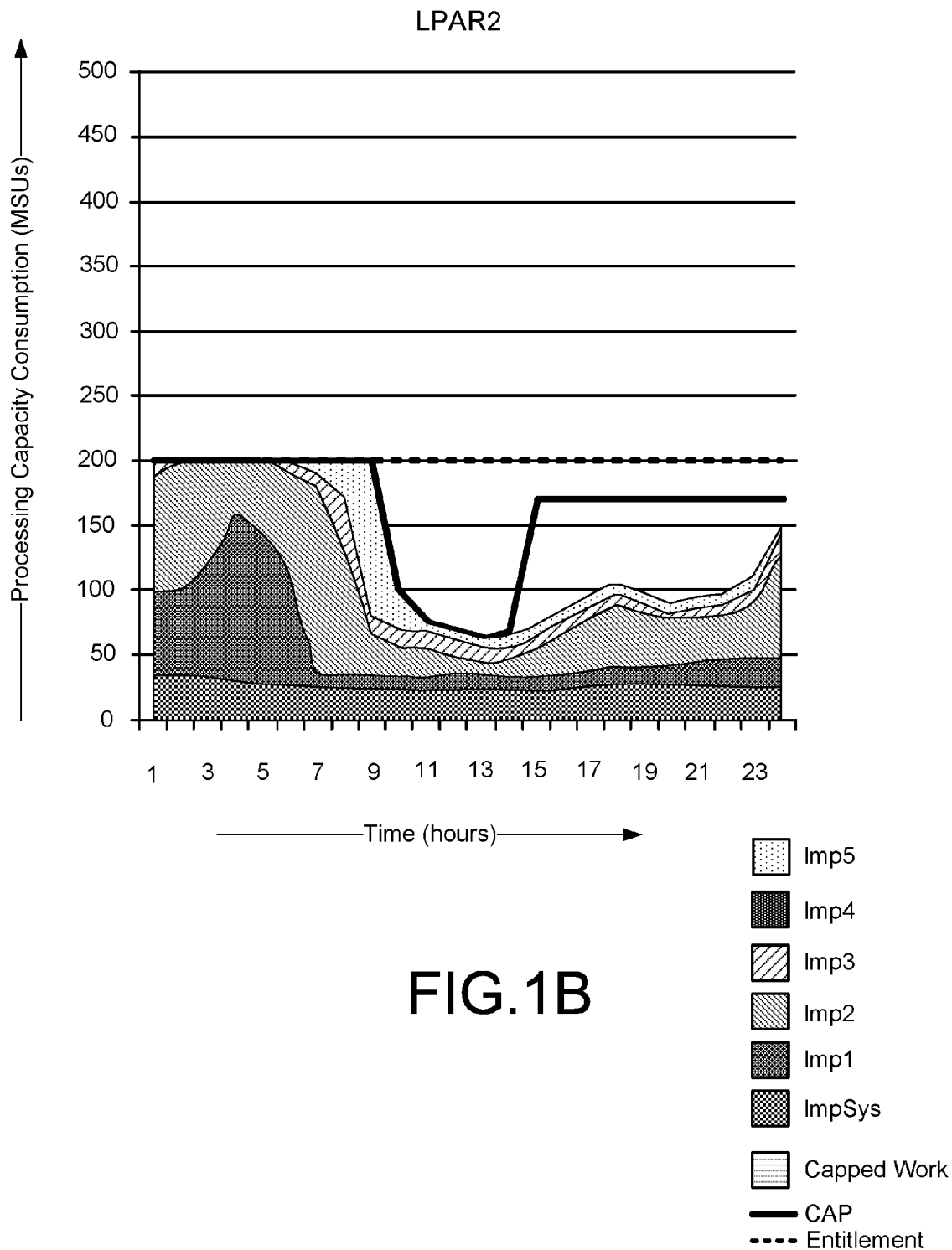
Figure 1C:
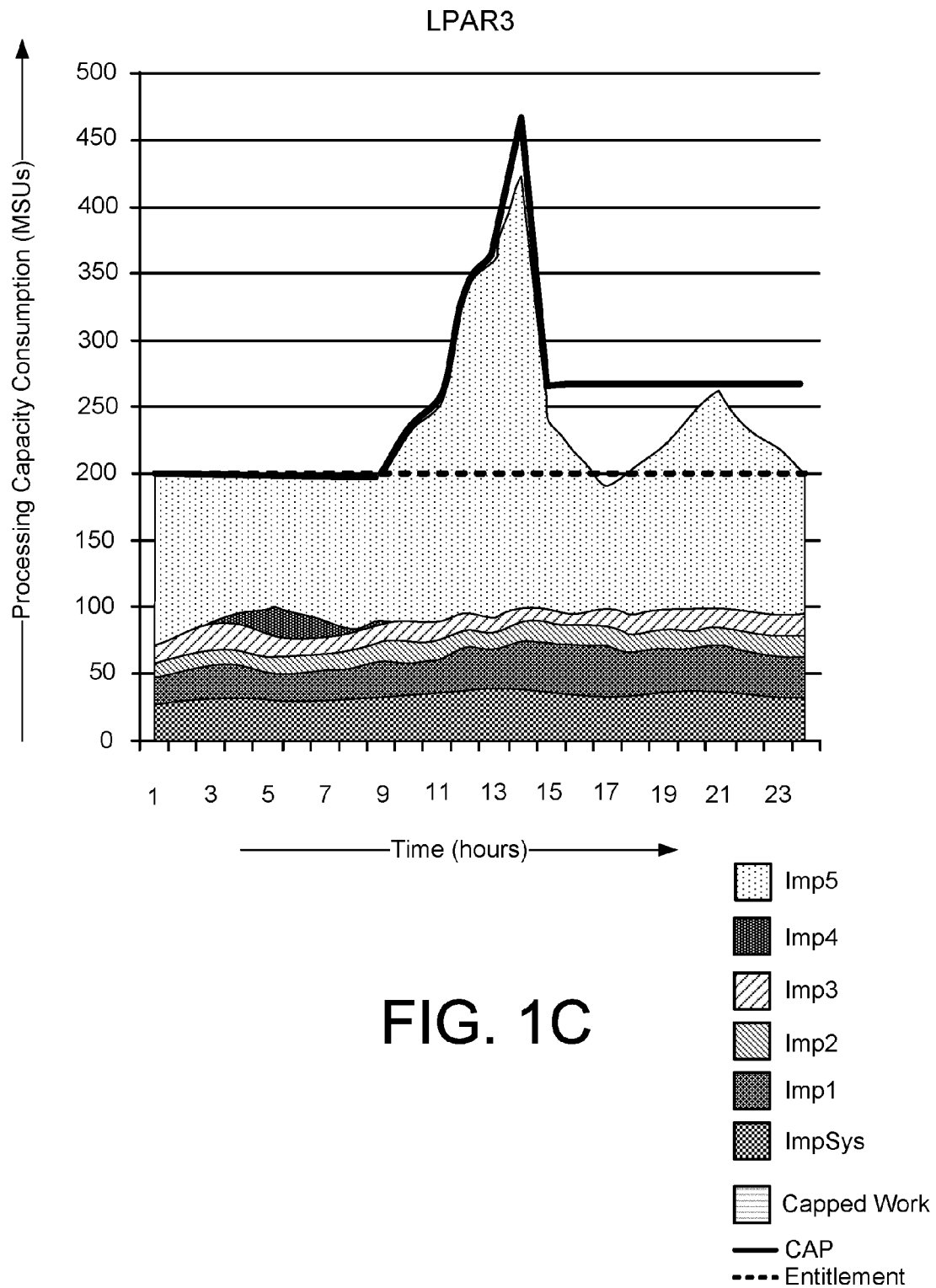

FIGS. 1A-1C are processing capacity consumption-versus-time graphs, which illustrate the effect of DC and fixed or static entitlement capping on computing workloads running, for example, on three different LPARs (i.e. LPAR1, LPAR 2, and LPAR3), respectively, over about a 24-hour time period in a test on a computer system. On each of the LPARs, in addition to system work with importance "Impsys," the computing workloads may, for example, include five pieces of work with different relative importance levels 1-5 (e.g., Imp1>Imp2>Imp3>Imp4>Imp5).

LPAR1, LPAR 2, and LPAR3 may have fixed or static entitlements, for example, of about 250, 200 and 200 MSUs, respectively. When the fixed or static entitlements are reached, the LPARs or CG is capped (meaning work is delayed) by IBM's Workload Manager (WLM) either because the Defined Capacity (DC) or Group Capacity Limit (GCL) has been reached. As shown in the figures for example, availability of processing capacity on each of LPAR1, LPAR 2, and LPAR3 may be "entitlement" capped during entitlement-based capping periods extending from about 0 to 9 hours.

As shown in FIG. 1B, LPAR2 may have high-importance work (e.g., Imp3 and Imp2 work), which is being capped and delayed during the entitlement-based capping period of about 0 to 9 hours. However, as shown in FIGS. 1A and 1C, LPAR1 and LPAR3 may have lots of low importance work (e.g., Imp5 work) running even during the respective entitlement-based capping periods of about 0 to 9 hours. The customer may instead want the high-importance work (e.g., Imp3 and Imp2 work) on LPAR2 to complete ahead of the low importance work (e.g., Imp5 work) running on LPAR1 and LPAR3. In other words, the customer may want LPARs with high importance work (e.g., on LPAR2) to be allowed to continue to grow at the expense of LPARs (e.g., LPAR1 and LPAR3) with low importance work. However, the fixed and static nature of entitlement does not allow that to happen.

In FIGS. 1A-1C, the static entitlement levels for LPAR1, LPAR 2, and LPAR3 (e.g., about 250, 200 and 200 MSUs, respectively) are indicated by dashed bold lines while the maximum entitlement-based capping levels are indicated by bold lines.

Dynamically Varying Processing Capacity Entitlement Scheme

In contrast to fixed or static entitlement schemes, the dynamic capping solutions described herein use dynamically varying entitlements to manage processing capacity availability on a mainframe for customer computing workloads, in accordance with the principles of the present disclosure. The dynamic capping solutions may dynamically vary the processing capacity entitlements for system usage entities (e.g., LPARs) in a managed group, for example, by transferring processing capacity MSUs preferentially from system usage entities (LPARs) running low importance work to system usage entities (LPARs) running high importance work. The dynamic capping solutions described herein may intelligently vary the entitlement for a system usage unit (e.g., an LPAR or a group of LPARs) as a function of the importance of work in a current computing workload running on the system usage unit. The entitlement for the system usage unit may be dynamically varied to encourage completion of high importance work running on the system usage unit preferentially over completion of low importance work in the current computing workload running on the system usage unit or on other system usage units in the managed group.

In an example dynamically varying entitlement scheme, a value of the dynamically varying entitlement ("new entitlement") assigned to the system usage unit (e.g., an LPAR) may be (1) a number of MSUs based on an adjusted high-importance work percentage (i.e. a relative amount of high importance work as may be indicated by WLM importance data) on the system usage unit, or (2) a fraction of the 4-hour rolling average (4HRA) of MSUs used by the system usage unit (when the fraction of the 4HRA is greater than the number of MSUs based on the adjusted high-importance work percentage). The fraction of the 4HRA MSUs that are included in the new entitlement may, for example, be about one half. The number of MSUs based on an adjusted high-importance work percentage that are included in the new entitlement may, for example, depending on the adjusted high-importance work percentage, be all of the MSUs that a system usage entity needs to complete the high importance work portion of its computing workload A reason for allocating a fraction of 4HRA MSUs as the new entitlement may be that for a "low importance" LPAR, which happens to run mostly low importance work, the number of MSUs based on the adjusted high-importance work percentage can be very low (or even zero) causing the new entitlement assigned to the low importance LPAR to be correspondingly low. However, the low importance LPAR may hold reserves and enqueues that are shared with high importance LPARs running on a same mainframe hardware box (CEC) as the low importance LPAR. Work on the high importance LPARs may be delayed if the low importance LPAR does not have sufficient MSUs to release the shared reserves and enqueues as may be the case when the new entitlement for the low importance LPAR includes only the low number of MSUs based on its low high-importance work percentage. Allocating at least some additional MSUs (e.g., a fraction of 4HRA MSUs) in the new entitlement for the low importance LPAR can avoid this delay. The new entitlement for each LPAR (e.g., the low importance LPAR) may be defined as the greater of one half the 4HRA and the number of MSUs based on the adjusted high-importance work percentage, in accordance with the principles of the present disclosure.

Using the foregoing example dynamically varying entitlement scheme, it is expected that if there are sufficient excess MSUs to share in a group of system usage entities, each LPAR or system usage entity will have a DC or GCL allocation that is sufficiently high so that all high importance work will be executed, even though the LPAR or system usage entity would be otherwise capped at its static entitlement.

Using the foregoing example dynamically varying entitlement scheme, LPARs with high percentages of high importance work that would be capped under the fixed or static entitlement schemes, for example, at DC=4HRA, can get extra processing capacity (MSUs) to complete the high importance work.

In another aspect, the foregoing example dynamically varying entitlement scheme allocates to the LPAR with the highest percentage of high importance work all MSUs needed to run its high importance work. On the mainframe computer system, WLM may schedule to run this high importance work before low importance work, and then give another LPAR with the next highest percentage of high importance work additional MSUs so it too could continue to grow. In example scenarios, the dynamically varying entitlement scheme may be implemented to allocate extra MSUs to LPARs with the highest percentages of high importance work, one-by-one, in decreasing order of the percentages of high importance work, until there are no more extra MSUs to share. This may imply that during peak usage times very low importance LPARs may, for example, not have sufficient MSUs to run anything other than high importance work. Low importance work (e.g., batch jobs) may be delayed so that processing on LPARs with very high importance work is not capped (capping would cause them to, for example, miss service level agreements).

Figure 2A:
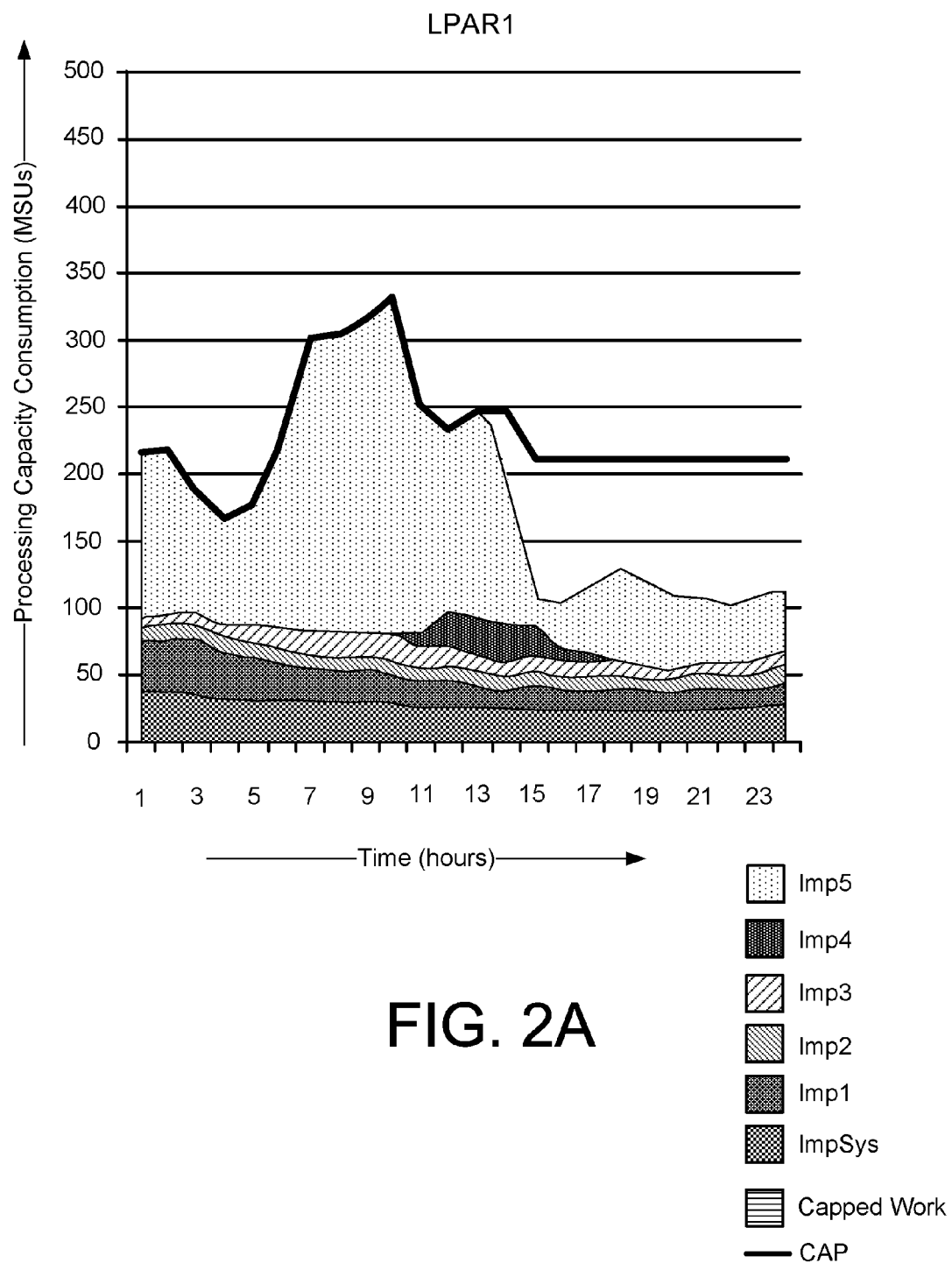
FIGS. 2A, 2B and 2C are processing capacity consumption-versus-time graphs, which illustrate the effect of having dynamically varying entitlements for capping the computing workloads running the LPARs of FIGS. 1A-1C, respectively, in accordance with the principles of the present disclosure.
Figure 2B:
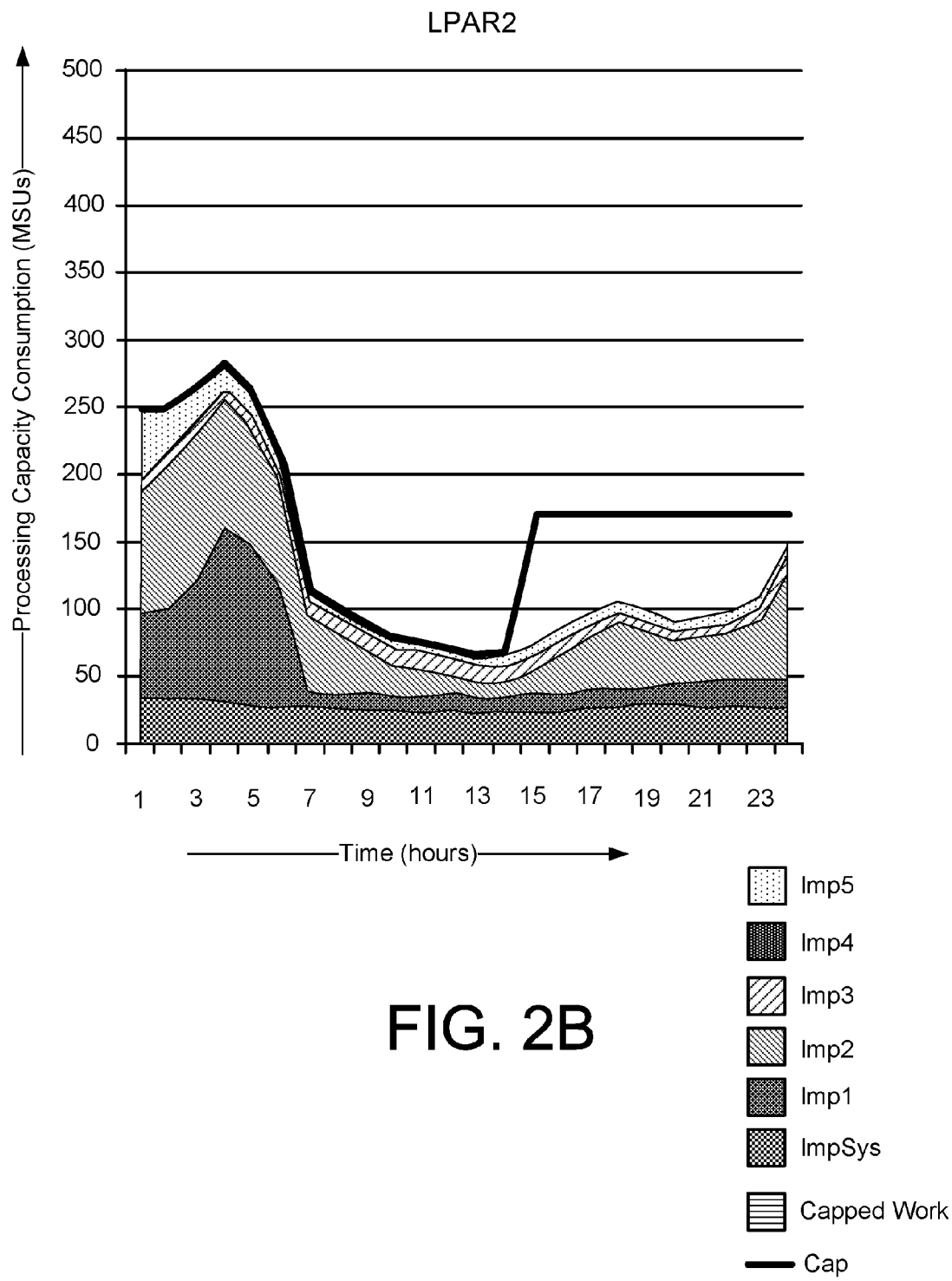
Figure 2C:
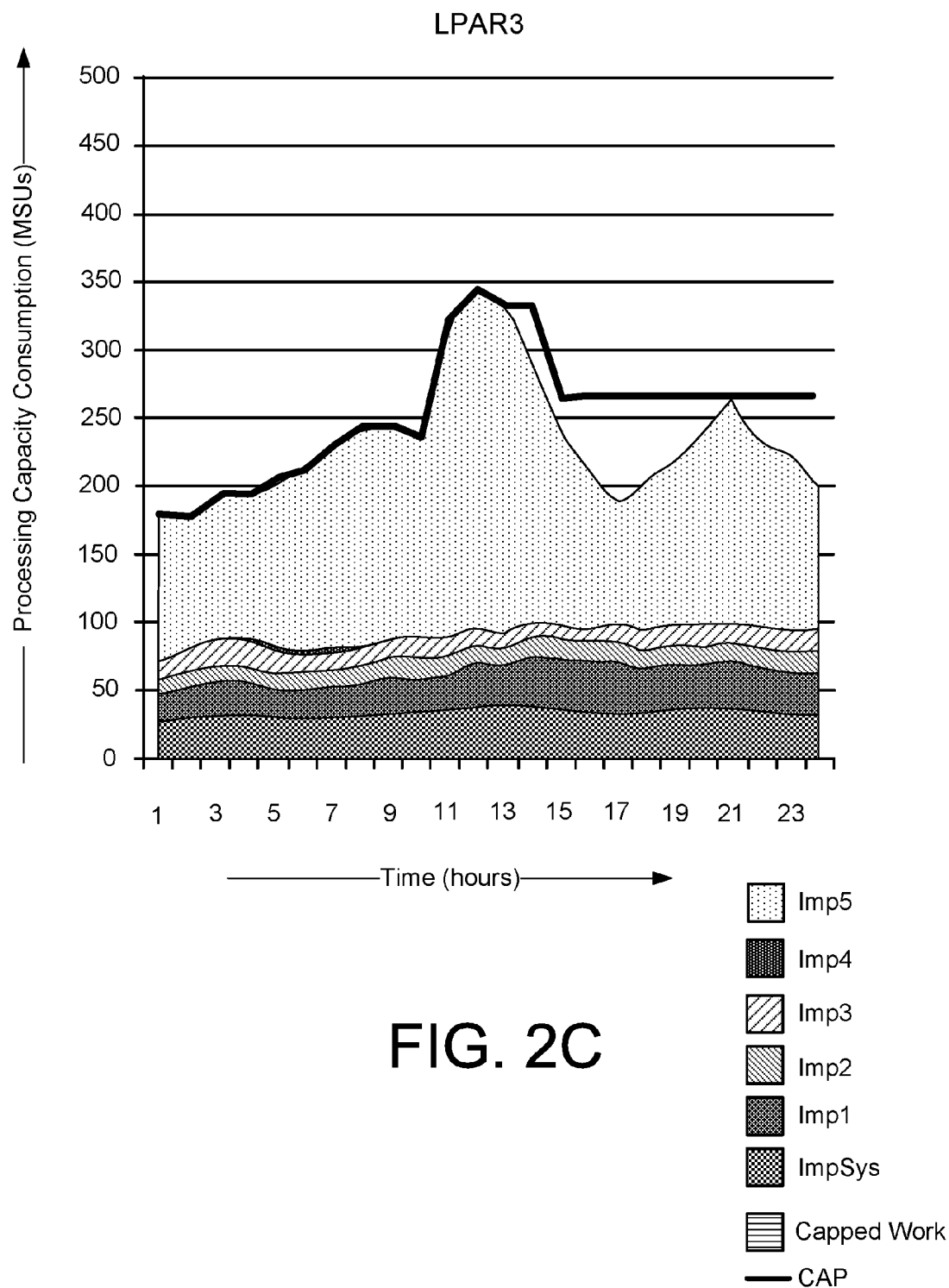

In contrast to FIGS. 1A-1C, which illustrate the effect of fixed or static entitlements, FIGS. 2A-2C are processing capacity consumption-versus-time graphs, which illustrate which the effect of having dynamically varying entitlements for capping the computing workloads running the LPARs (i.e. LPAR1, LPAR2, and LPAR3), in accordance with the principles of the present disclosure. In the example shown in the figures, the dynamically varying entitlements scheme reduces the entitlements for LPAR1 and LPAR3 which run low importance work and increases the entitlement for LPAR2 which runs high importance work. As seen from FIG. 2B, unlike the static entitlement scenario of FIG. 1B, high importance work (e.g., Imp2 and Imp3 work) on LPAR2 is not delayed by capping.

Figure 3:
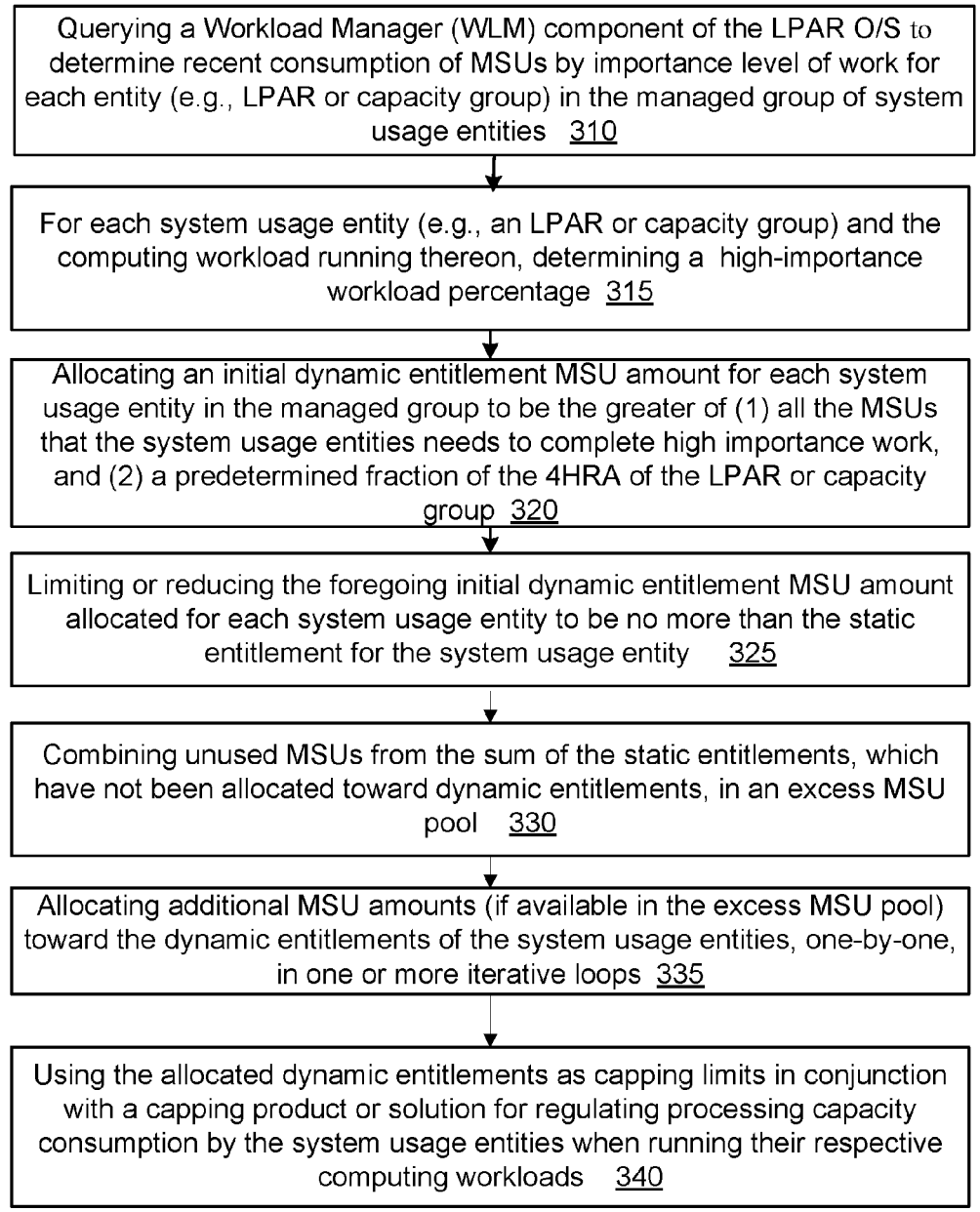
FIG. 3 is a flowchart illustrating an example method for implementing a dynamic entitlement scheme for a managed group of LPARs that are running respective computing workloads on a mainframe computer system, in accordance with the principles of the present disclosure.

FIG. 3 shows an example method 300 for implementing a dynamic entitlement scheme for a group of system usage entities that are running respective computing workloads on a mainframe computer system, in accordance with the principles of the present disclosure. The group of system usage entities may include individual LPAR and/or capacity groups of LPARs. The computing workloads may have different portions of work with different importance levels, which may be user assigned. The importance levels may, for example, be on a scale of 1 (most important) to 5 (least important). The importance levels may be recorded in, or determined, by WLM components of the mainframe computer system's operating system. The importance levels of the portions of work may be referred to herein as the "WLM importance levels."

A user may set a user-defined threshold level to distinguish high importance work from low importance work. For example, the user may define importance levels 3 and less as being high importance work and importance levels greater than 3 as being low importance work. In another instance, the user may, for example, define importance levels 1 and 2 as being high importance work and importance levels greater than 2 as being low importance work. In yet another instance, the user may, for example, define only importance level 1 as being high importance work and importance levels greater than 1 as being low importance work.

Method 300 may be used to implement the dynamic entitlement scheme when the customer has specified that dynamic entitlement should be used for a group of system usage entities (e.g., LPARs and/or capacity groups of LPARs) specified, for example, in a policy. This group of system usage entities may be referred to herein as the "managed" group of system usage entities. The customer may, for example, specify use of dynamic entitlement and the parameters for the dynamic entitlement for the managed group in a capping policy maintained by the mainframe computer system. Method 300 may implement the dynamic entitlement scheme according to parameters in the capping policy, for example, when a central processor complex (CPC) of the mainframe computer system is approaching a customer specified peak for MSUs consumption, and when all LPARs in the managed group use a consistent scale for importance levels (e.g., 1 to 5, or 1 to 5+ discretionary, etc.) of work.

Method 300 may involve querying a Workload Manager (WLM) component of the LPAR operating systems to determine recent consumption of MSUs by computing workloads running on each entity (e.g., LPAR or capacity group) in the managed group of system usage entities (310). The WLM may return information including a breakdown of MSU consumption, for example, by service class, service class period, and importance level, etc. for each system usage entity in the managed group. The WLM may also determine a rolling average of processing capacity consumption (e.g., 4HRA) for each system usage entity in the managed group.

Method 300 may further include, for each system usage entity (e.g., an LPAR or capacity group) and the computing workload running thereon, determining a high-importance workload percentage (HIWP) (315). HIWP may be determined (from information returned by the WLM), for example, as the number of MSUs consumed for high importance work divided by number of MSUs consumed for all work by the system usage entity. Determining the high-importance workload percentage may further involve determining an adjusted high-importance workload percentage (AHIWP).

In example implementations, determining an AHIWP may involve, for each LPAR or capacity group, first determining a low-importance workload percentage (LIWP) as the percentage of standard CPU consumption of service class periods having low importance over the consumption of all service class periods in a time interval. The time interval may, for example, be the last five minutes. In example implementations, the LIWP may be determined, for example, using the MVS service IWMRCOLL, which may be available on the mainframe computer system.

Further, each LPAR or capacity group in the managed group may also have a user-assigned priority value (e.g., on a scale of 1 to 6 with 1 being the highest priority, and 6 being the lowest (or a discretionary) priority) on the mainframe computer system. The user assigned priority levels may, for example, be recorded in a policy on the mainframe computer system. Method 300 may further include biasing the dynamic entitlements (which depend on the percentages of high-importance work) toward higher priority LPARs or capacity groups. This may involve determining an adjusted low-importance workload percentage (ALIWP) by associating a priority adjustment factor with each priority value for the managed group and multiplying the LIWP (determined, for example, using the MVS service IWMRCOLL) by the associated priority adjustment factor according to priority to determine the ALIWPs for each LPAR or capacity group. The priority adjustment factors may, for example, be selected to adjust LIWPs of high priority LPARS downward and LIWPs of low priority LPARS upward. In an example implementation, adjustment factors of 0.6, 0.8, 1.0, 1.2, and 1.4 may, for example, be associated with priority values 1-5, respectively, to adjust high priority LIWPs downward and low priority LIWPs upward.

Next, the AHIWP may be determined by subtracting the ALIWP (determined for each LPAR or capacity group) from 100%. These AHIWP values in some instances can be less the zero because of the values of the associated priority adjustment factors (e.g., 1.2 and 1.4) used to adjust low priority LIWPs upward.

Method 300 may include assigning dynamic entitlement values or amounts for the system usage entities in the group based on the high-importance work load percentages (HIWP) (or the priority adjusted high-importance workload percentages (AHIWP)) of the system usage entities. The assigned dynamic entitlement values or amounts may, for example, be linearly or non-linearly dependent on the HIWP (or the AHIWP).

Each LPAR or capacity group may have a user defined fixed or static entitlement value of MSUs available for running computing workloads thereon. A total number of MSUs available collectively for running computing workloads on the system usage entities in the managed group may be the sum of the static entitlements of the individual system usage entities in the managed group. The foregoing total number of MSUs available or the sum of the static entitlements may be referred to herein as the "maximum MSU limit" for the managed group. Method 300 may be configured to redistribute the total number of MSUs available for running computing workloads on the system usage entities in the managed group in a manner which encourages quicker completion of high importance work preferentially over completion of low importance work.

In an example implementation, method 300 may include allocating an initial dynamic entitlement MSU amount (from the maximum MSU limit) toward the dynamic entitlement for each system usage entity in the managed group as the greater of (a) all the MSUs that the system usage entity needs to complete high importance work, and (b) a predetermined fraction of the 4HRA of the LPAR or capacity group (320). The predetermined fraction may, for example, be about one half (i.e. about 50%).

Further, method 300 may include limiting or reducing the foregoing initial dynamic entitlement MSU amount allocated for each system usage entity to be no more than the static entitlement for the system usage entity (325). Keeping the initial dynamic entitlement MSU amount allocated to each system usage entity at or below the static entitlement for the system usage entity ensures that the total of the initial dynamic entitlement MSU amounts allocated to the system usage entities does not exceed the maximum MSU limit (e.g., the sum of the static entitlements) for the managed group.

After allocating the initial dynamic entitlement MSU amounts toward the MSUs that the system usage entities need to complete high importance work, there may still be unused MSUs available from the maximum MSU limit as the total of initial dynamic entitlement MSU amounts (which are <static entitlements) will be generally less than the maximum MSU limit. Method 300 may include combining unused MSUs (e.g., which have not been allocated toward dynamic entitlements) in an excess MSU pool (330).

Method 300 may further include distributing the unused MSUs in the excess MSU pool as additional MSUs toward increasing the initial dynamic entitlement MSUs amounts allocated to the system usage entities in the managed group based, for example, on percentage of the high importance work in the computing workloads of the system usage entities.

In an example implementation, method 300 may include allocating additional MSU amounts (if available in the excess MSU pool) toward the dynamic entitlements of the system usage entities, one-by-one, in one or more iterative loops (335). Each iterative loop allocating additional MSU amounts may begin with the system usage entity having the lowest ALIWP, proceed to the system usage entity having the next lowest ALIWP, and end with the system usage entity having the highest ALIWP. The iterative loops for allocating the additional MSU amounts to the system usage entities, one-by-one, may continue until the excess MSU pool is depleted.

In a first iterative loop, starting with the system usage entity having the lowest ALIWP, for each system entity, method 300 may, for example, involve determining a percentage of the 4HRA MSUs consumed by the system usage entity for high importance work (e.g., as HIWP*4HRA). If this percentage of the 4HRA MSUs consumed by the system usage entity for high importance work (i.e. HIWP*4HRA) is greater than initial dynamic entitlement MSUs amount (allocated at 325), allocating additional MSU amounts (if available in the excess MSU pool) may involve utilizing unused MSUs in the excess MSU pool to increase dynamic entitlement for the system entity to be about equal to the percentage of the 4HRA MSUs consumed by the system usage entity for high importance work (i.e. =HIWP*4HRA MSUs). If the percentage of the 4HRA MSUs consumed by the system usage entity for high importance work (i.e. HIWP*4HRA) is less than or equal to the initial dynamic entitlement MSUs amount, no additional MSUs are allocated toward the dynamic entitlement of the system usage entity.

If there still are unused MSUs left in the excess MSU pool after the first iterative loop, in a second iterative loop starting with the system usage entity having the lowest ALIWP, method 300 may involve utilizing unused MSUs in the excess MSU pool to further increase dynamic entitlement for each system entity in the managed group, for example, by an amount based on a percentage of the 4HRA MSU consumption of the system usage entity. In an example implementation, amount based on the percentage of the 4HRA MSU consumption may, for example, be 1% 4HRA+1 (rounded to the next highest integer).

If there still are unused MSUs left in the excess MSU pool after the second iterative loop, in a third iterative loop starting with the system usage entity having the lowest ALIWP, method 300 may involve utilizing unused MSUs in the excess MSU pool to further increase dynamic entitlement for each system entity in the managed group, for example, by a fixed number of MSUs (e.g., 1 MSU).

The one or more iterative loops (e.g., the third iterative loop) for allocating the additional MSU amounts toward the dynamic entitlements of the system usage entities may continue until the excess MSU pool is depleted.

Method 300 may include using the dynamic entitlements (allocated at 325 or 335) as capping limits in conjunction with a capping product or solution for regulating processing capacity consumption by the system usage entities when running their respective computing workloads (340).

The foregoing dynamic capacity entitlement schemes (or method 300) may be integrated, for example, with a dynamic capping system, which intelligently controls the processing capacity limits of system usage entities (e.g., LPARs and capacity groups) based on workload importance within a maximum capacity limit set by the customer, in accordance with the principles of the present disclosure. An example system 100 is shown in FIG. 4.

Figure 4:
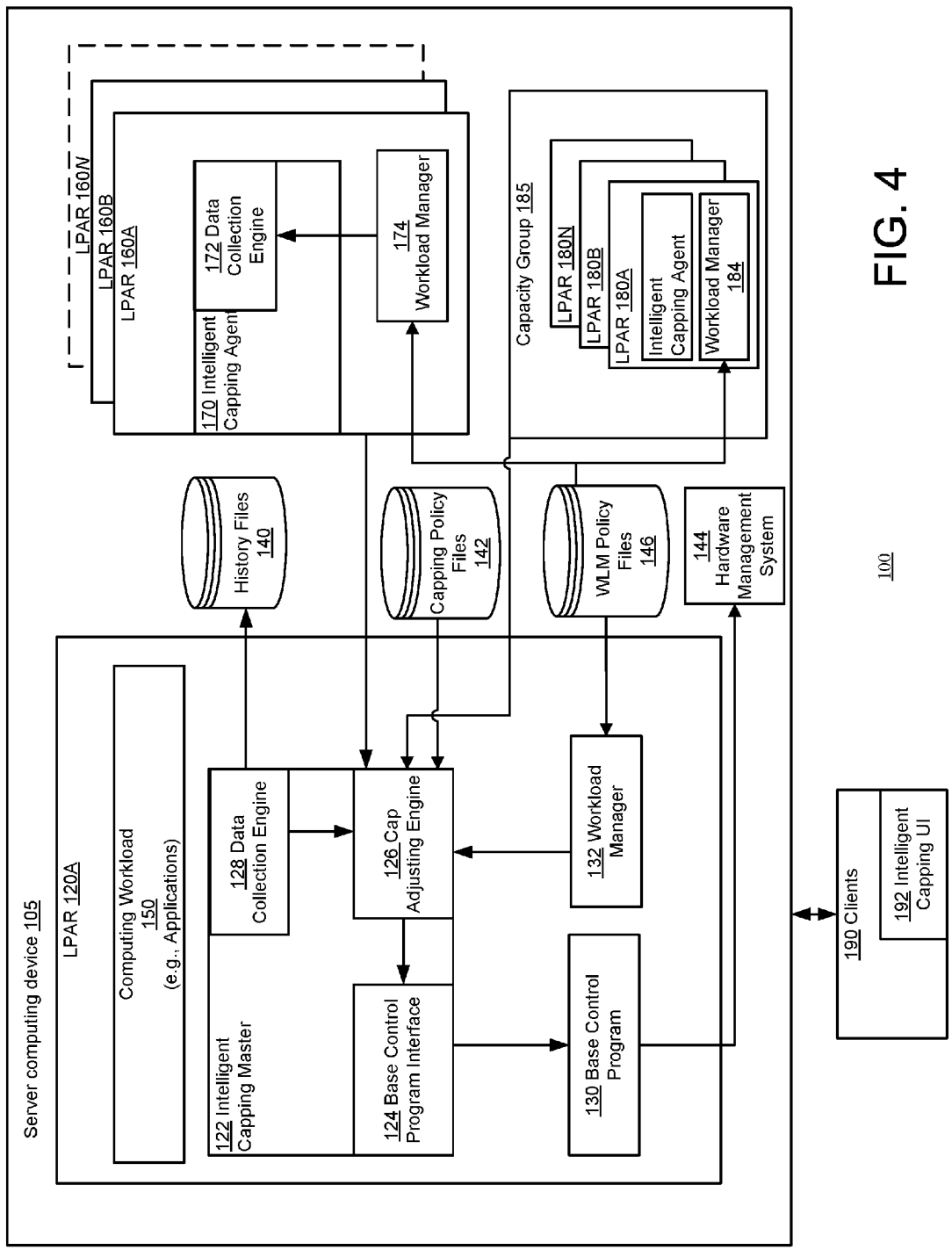
FIG. 4 is a block diagram illustration of a dynamic capping system using a dynamic entitlement scheme for managing a group of LPARs that are running respective computing workloads on a mainframe computer system, in accordance with the principles of the present disclosure.

FIG. 4 is a schematic block diagram of a dynamic capping system 100 in which one or more server computing devices (e.g., computing devices 105) provide computing or processing capacity to one or more clients 190. Computing device 105 may be, for example an IBM zSeries® mainframe computer (zSeries® is a registered trademark of the IBM Corporation) or another mainframe or computing device where processing usage by the clients is tracked. In some implementations, computing device 105 may represent multiple distributed mainframe computers.

Computing device 105 can include one or more processors (CPUs) or banks of processors capable of executing one or more machine executable instructions or pieces of software, firmware, or a combination thereof. A plurality of processors may be managed as one or more central processor complexes. A central processor complex may include physical CPU hardware that is managed as a group. Computing device 105 may also include one or more computer readable storage devices (e.g., main memory, cache, or disk storage) configured to store data and/or applications. The storage devices may include volatile memory, non-volatile memory, or a combination thereof.

Computing device 105 includes an operating system. The operating system can be the z/OS operating system or some other mainframe operating system. The operating system may include a hardware management system 144. The hardware management system 144 may define and maintain several parameter values for scheduling and executing computing workloads on computing device 105. For example, each customer may set static capacity entitlement limits or may indicate use of dynamic capacity entitlements for the workloads that the customer runs on computing device 105. These capacity limits may be implemented via the hardware management system 144. One example of a hardware management system is Processor Resource/System Manager (PRISM), which is firmware that manages the definition and resource allocation of LPARs and capacity groups. The PR/SM may be accessed via a Hardware Management Console (HMC), an IBM-provided network attached console interface to PR/SM. It will be understood that hardware management system 144 thus may be either the hardware management system (e.g., PR/SM), or an interface for accessing the system (e.g., HMC).

With reference to FIG. 4, a customer may have licensed or have been granted limited use of the processing capacity of computing device 105 provided via one or more LPARs (e.g., LPAR 120A, LPAR 160A, LPAR 160B, etc.) and/or LPAR capacity groups (e.g., capacity group 185, etc.) to run the customer's computing workloads (e.g., computing workload 150). The customer may define a specific processing capacity limit (e.g., a Defined Capacity (DC)) for each LPAR, and a specific processing capacity limit for each LPAR capacity group within the total processing capacity for computing device 105 licensed or granted to the customer. Further, in managing execution of the computing workload on computing device 105 from the customer's perspective, the customer may allocate a limited number of MSUs (hereinafter referred to as "static entitlement") to each LPAR for running the computing workload. A static entitlement may be viewed as a customer-defined capacity limit. For convenience in description, the term "capacity limit" may be used herein to refer to a DC, a GCL, a static entitlement or a dynamic capacity entitlement.

Hardware management system 144 may store and maintain these processing capacity limits (i.e. DC, GLC, or static entitlements). These processing capacity limits may be enforced to control processing capability usage when executing the computing workload (e.g., computing workload 150) on computing device 105.

In an example implementation, the operating system of each LPAR may include a respective workload manager component (e.g., workload manager 132 workload manager 174, workload manager 184, etc.). The workload manager component of an LPAR allocates processing time and other resources for work requested by application programs (e.g., computing workload 150) running on the LPAR. In other words, the workload manager component manages the scheduling of requested work on the physical processors. A workload manager component may, for example, use the capacity limit for an LPAR or capacity group to determine which work may be scheduled for execution by processors or whether work should be postponed or delayed due to lack of capacity. The workload manager component may use a customer-defined workload service policy (which may, for example, be stored in WLM policy files 146) to associate each request for work with a service class, a service class period and an importance level. The customer-defined workload service policy may include directives and parameters to help prioritize work on server computing device 105. The customer-defined workload service policy may enable the customer to assign work (e.g., batch jobs, online transactions, etc.) to a service class, a service class period, and an LPAR, etc. The importance level may be a value set by the customer (e.g., for the service class period) and can be used by system 100 in combination with low importance criteria in a dynamic capping policy to determine whether work is considered low importance work or not. The service class and service class period can be used by the workload manager to determine how much processing time a work request needs.

The workload manager component (e.g., workload manager 132, workload manager 174, and workload manager 184, etc.) of an LPAR may receive requests for work that exceed the available resources (e.g., processing time). In such an instance, the workload manager component may use a workload service policy (stored, e.g., in WLM policy files 146) for the LPAR to allocate the resources and dispatch work according to the goals and directives indicated in the service policy within the capacity limits of the LPAR. When the LPARs are part of a SYSPLEX, the scope of the workload manager component of the LPAR may be governed by a single "SYSPLEX" workload service policy covering all LPARs in the SYSPLEX.

In order to implement the capacity limits on the computing workloads, system 100 may include an intelligent capping master 122 and one or more intelligent capping agents 170. Intelligent capping master 122 may run on one of the LPARs in system 100, for example, on LPAR 120A. Intelligent capping master 122 may include a cap adjusting engine 126. Cap adjusting engine 126 may dynamically adjust the capacity limits of LPARs using information from the workload managers of LPARs, capacity groups, or SYSPLEXes that are managed by the customer. For example, cap adjusting engine 126 may receive information from workload manager 132, workload manager 174, and workload manager 184. The information provided by the workload managers may include a most recent rolling average of processing capacity usage. In some implementations, the rolling average may be a 4-hour-rolling-average (4HRA) of CPU consumption, which may be measured, for example, in millions of service units (MSUs). As used herein, MSU's may refer generally to any unit used to measure CPU processing time. The rolling average and the current MSU consumption data provided by the workload managers may, for example, be broken down by service class, service class period, importance level, and LPAR assignment. This breakout may enable cap adjusting engine 126 to determine what percentage of work is low-importance work and what percentage of work is high-importance work for each LPAR or capacity group.

Cap adjusting engine 126 may use a capping policy to determine when and how to adjust capacity limits for each LPAR or capacity group in a managed group of system usage elements (e.g., LPARs, groups of LPARs), in accordance with the principles of the present disclosure. The capping policy (e.g., stored in capping policy files 142) may specify that dynamic entitlement should be used for managing computing workloads on the managed group of system usage elements (e.g., LPARs, groups of LPARs). The capping policy may also specify how to distinguish low-importance and high-importance work, and how to allocate excess MSUs from an excess MSU pool to LPARs based on importance of work, as previously discussed with reference to FIGS. 2A-2C and 3).

In some implementations, information from each workload manager component and the capping policy may be collected by a data collection engine 128, for example, by querying each workload manager at intervals. In some implementations, the interval may be based on how often the workload manager refreshes the rolling average of processing capacity usage. In some implementations, the interval may be a fixed period, for example, one minute. Data collection engine 128 may also obtain the capacity limits for each LPAR, and workload service policy information. In some implementations, data collection engine 128 may receive this information from the workload managers. In other implementations, data collection engine 128 may obtain the information, for example from WLM policy files 146, capping policy files 142, and/or hardware management system 144. Data collection engine 128 may provide the information to cap adjusting engine 126, which may use the information to determine whether any of the LPAR capacity limits can or need to be adjusted. The adjustment may, for example, involve dynamic capacity entitlements based on the relative importance of work being executed on the LPARs (as previously discussed with reference to FIGS. 2A-2C and 3).

Intelligent capping master 122 may also include a base control program interface 124. The base control program interface may be an interface to a base control program 130. Base control program 130 may provide authorized programs access to the hardware management system 144. An example of base control program 130 is BCPii for IBM z/OS. Intelligent capping master 122 may use base control program 130, for example, to access and modify identification of the LPARs and the capacity limits of LPARs covered by the dynamic capacity policy.

In some implementations, intelligent capping master 122 may generate log records, for example, for history files 140. History files 140 may include records showing how cap adjusting engine 126 modified the capacity limits of managed LPARS over time. History files 140 may be used, for example, to generate reports for the customer.

In system 100, each LPAR that is not a master (e.g., LPARs 160A, 160B, . . . , and 160N, LPARs 180A to 180N, etc.) may include an intelligent capping agent (e.g., intelligent capping agent 170). Each Intelligent capping agent 170 may include a respective data collection engine 172, which may be similar to data collection engine 128. Each data collection engine 172 may collect data for the respective LPAR (e.g., LPAR 160A, 160B, . . . , and 160N, etc.) and send the collected data to intelligent capping master 122.

In example implementations, system 100 may include one or more clients (e.g., client 190). Client 190 may include a display or monitor, a keyboard, a touchscreen, a camera, a mouse, a touchpad, a trackpad, a video processor, etc., through which a user may send data to, and receive data from, or launch applications (e.g., computing workload 150) on computing device 105. Client 190 may, for example, be a desktop computer, a laptop computer, a tablet computer, etc., running an intelligent capping user interface 192 that communicates with intelligent capping master 122. Thus, a customer or other user may monitor the results of using intelligent capping master 122, may set parameters used by intelligent capping master 122, or may adjust the parameters of a dynamic capping policy via user interface 192. Client 190 may also use other interfaces (not shown) to interact with computing device 105. It will be understood that client 190 may communicate with computing device 105 via a variety of networks (not shown), whether local (e.g., LAN) or distributed (e.g., the Internet).

Although system 100 is discussed above using an IBM zSeries® mainframe computing environment as an example, implementations of system 100 are not limited to IBM zSeries® mainframes as the concepts disclosed herein can be applied to or used in other computing environments.

FIG. 5 is schematic illustration of an example user interface 500 for maintaining a dynamic capping policy (which may be stored, for example capping policy files 142 in the system of FIG. 4), in accordance with the principles of the present disclosure. Interface 500 may be generated, for example, by a dynamic capping system, such as system 100 of FIG. 4 and displayed to a customer (e.g., as part of user interface 192 on client 190). In some implementations, interface 500 may display information about a policy file, for example, from capping policy files 142. The information about the policy file may include information about LPARs 205 covered by a specific dynamic capping policy for a customer. The policy may be identified by a name 280 (e.g., DYCWLMPB). Further, the dynamic capping policy may be associated with a customer-specified maximum MSU limit 285. The maximum MSU limit 285 may represent an upper limit for the customer's processing capacity usage on the computer system (across all LPARs 205), for example, for one month. MSU limit 285 may be controlled (e.g., set) by the customer. The system may optimize processing capacity use within this limit, for example, by favoring MSU allocations to system usage units (e.g. LPARs or groups of LPARs) having higher-importance workloads and/or higher organizational priority. Maximum MSU limit 285 is shown in the figure as a numerical quantity, e.g., 400 MSUs. The maximum MSU limit may also be referred to as the customer cap, as all work running on the dynamic capping system for the customer cannot exceed the customer cap.

The dynamic capping policy may also include an indication 290 of whether dynamic entitlements should be used for the dynamic capping. In some implementations, indication 290 may be either "Yes" or "No."

The dynamic capping policy may identify a managed group of system usage entities (e.g., LPARs 205, which may be LPARs or a group of LPARs) covered by the policy. LPARs 205 may be listed by name, for example, the name of the LPAR or capacity group. Any dynamic adjustment of capacity limits may occur only for LPARs 205 identified in the policy. User interface 500 may include an indication 210 of which system usage entity type the name represents. For example, in some implementations, an LPAR type is identified by the alphabet '1' and a capacity group type by the alphabet 'G' in indication 210. User interface 500 may include a customer-specified indication of a proportion 215 of the maximum MSU limit. The customer-specified proportion 215 represents the portion of the maximum MSU limit 285 that the system usage entity is entitled to as a fixed or static entitlement. LPARs need not share the MSUs under the maximum MSU limit 285 equally.

Interface 500 may also display the fixed or static entitlement value 220 for each system usage entity. The entitlement may be expressed in MSUs and may be determined based on proportion 215, a total of all proportions 215 in the policy, and maximum MSU limit 285. For example, if the customer sets a maximum MSU limit 285 for the policy at 400 MSUs, the system may determine fixed or static entitlement value 220 by dividing proportion 215 for the system usage entity (e.g., 555) by the total proportions (1006) and multiplying the result by MSU limit 285 (e.g., 400), which provides the service unit entitlement value (e.g., 555/1006*400=222) for the system usage entity. The static entitlement represents the maximum rolling average (e.g., a 4HRA) of processing capacity that a system usage entity can consume. If the system usage entity is consuming less than its static entitlement, it may have excess MSUs which can be added to an excess MSU pool and be made available to other system usage entities, for example, under the dynamic entitlement scheme. Conversely, if a system usage entity is consuming more than its entitlement, it may be allocated additional MSUs from the excess MSU pool under the dynamic entitlement scheme to avoid delays in work completion.

Interface 500 may also display a priority 225 of each system usage entity. The priority may be assigned by the customer to each system usage entity (e.g., LPARs, groups of LPARs) in the dynamic capping policy. Priority 225 may represents the relative importance of the system usage entities. System 100 may consider the priority of each system usage entity when determining which LPARs can or should receive additional MSUs. Interface 500 may also display a low-importance workload percentage 230 calculated for each system usage entity. The low-importance workload percentage 230 may represent the percentage of standard CPU consumption of work with service class periods having low importance over the consumption of all service class periods, for example, over the last five minutes. Low-importance work may be determined based on the importance criteria identified in the dynamic capping policy. In one example, the importance criteria may specify which importance levels are considered low importance. The importance level of work may be assigned to the service class and service period, for example in the WLM policy. For example, the WLM policy may indicate a particular service class has one of a number of importance levels, regardless of the service period. As another example, the WLM policy may specify a different importance level for certain service periods of a service class. For example, some service classes may include multiple service periods, and when an entity (address space) uses a threshold number of MSUs the system will drop the service period for the entity, e.g., dropping from service period 1 to service period 2, and later from service period 2 to service 3, etc. The WLM policy may specify a different importance level for each of the service periods. The importance criteria in the dynamic capping policy may determine which of the importance levels are considered low importance. The dynamic capping policy may include importance criteria by SYSPLEX. Thus, for example, importance levels of 5 and higher may be low-importance on a first SYSPLEX while importance levels of 3 or higher may be low-importance on a second SYSPLEX. While the importance criteria above use importance levels, it will be understood that the importance criteria could use service class or a combination of service class and service class period, or an equivalent. In some implementations using IBM mainframes, the low-importance work percentage may be determined from the answer area of the MVS service IWMRCOLL. In some implementations using an IBM mainframe, the low-importance work percentage is determined from the Service Management Facility type 72-3 records. The Service Management Facility records and stores both system-generated and application-generated activity records, which may subsequently be read and processed for many purposes.

Interface 500 may also display the adjusted low-importance workload percentage 235. Adjusted low-importance workload percentage 235 may represent a priority-based adjustment of the low-importance workload percentage 230. For example, the dynamic capping policy may indicate a customer-assigned priority 225 for each system usage entity. The priority may be associated with a corresponding adjustment factor, where higher priority is associated with a lower adjustment factor. For example, a system may have priorities ranging from 1 to 5, with 1 being the highest priority. The respective adjustment factors may be 0.6, 0.8, 1.0, 1.2, and 1.4, where the highest priority has the adjustment factor of 0.6 and the lowest priority has the adjustment factor of 1.4. In practice, these adjustment factors favor higher-priority LPARs, by making it appear as though a high-priority system usage entity has less low-importance work than actually determined. The numbers and values of importance levels, priorities and adjustment factors given above are only for example. It will be understood the implementations of system 100 are not limited to the numbers and values discussed above.

Interface 500 may also display a rolling average 240 for each system usage entity. Rolling average 240, which may be determined by a workload manager (e.g., workload manager 132), represents a rolling average of CPU consumption (measured in MSUs) for the system usage entity. Although a four-hour rolling average (4HRA) is used herein as an example, it will be understood that another time period (e.g., six-hour rolling average, etc.) may be used, depending on the implementation. The rolling average time period will generally be orders of magnitude larger (e.g., hours) than the interval at which the capacity limits are adjusted (e.g., minutes). Because the rolling average covers an extended time period, the rolling average changes gradually. The rolling average (e.g., 4HRA may be used to dynamically adjust the capacity limits of the LPARs. In some implementations, the workload manager refreshes the rolling average at regular intervals, for example, every 10 seconds or every minute. In some implementations, the dynamic capping system can mirror this interval by adjusting (when needed) capacity limits using the same or similar interval. Thus, for example, when the workload manager refreshes the rolling average, the system may obtain the refreshed rolling average and determine whether capacity limits should be adjusted. In some implementations, the dynamic capping system may adjust the capacity limits at a different interval. For example, the workload manager may refresh rolling averages several times a minute, but the dynamic capping system may adjust the capacity limits every minute. User interface 500 may also display a current capacity limit 245 for each system usage entity. Capacity limit 245 represents the maximum number of MSUs the system usage entity has access to and is used by the workload manager to decide whether any work needs to be deferred or delayed to meet the capacity limit. In some implementations, the capacity limits represent either a defined capacity (for an LPAR) or group capacity limit (for a capacity group), depending on the type of system usage entity. Example interface 500 may also display other information (e.g., MSU cost 221 and cost entitlement 223) for the LPARs 205 covered by the policy. Example interface 500 may also display other information, which for visual clarity is not shown in FIG. 5. For example, user interface 500 may use historical records, such as history files 140, to show, for each system usage entity, the lowest value for the capacity limits in the most recent period (e.g., 4 hours, 6 hours, 12, hours etc.), the highest value for the capacity limits in the most recent period, the lowest rolling average or highest rolling average in the most recent period, etc. Such historical records may allow the customer to determine whether to adjust the parameters of the dynamic capping policy, such as the proportions or the priority level of any particular system usage entity.

Implementations of the various techniques described herein may be implemented in digital electronic circuitry, or in computer hardware, firmware, software, or in combinations of them. Implementations may implemented as a computer program product, i.e., a non-transitory computer program tangibly embodied in an information carrier, e.g., in a machine-readable storage device (e.g., a computer-readable medium, a tangible computer-readable medium), for processing by, or to control the operation of, data processing apparatus, e.g., a programmable processor, a computer, or multiple computers. In some implementations, a non-transitory tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). Method steps are not limited to the order illustrated by example processes herein.

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method for running computing workloads on a group of system usage entities of a mainframe computer system, each of the system usage entities including a logical partition (LPAR) or a group of LPARs, each of the system usage entities having a static processing capacity entitlement for running a computing workload thereon, the computing workload having different portions of work corresponding to different importance levels, wherein the importance levels are user assigned, the method comprising:

for each of the system usage entities, determining consumption of processing capacity by the different portions of work corresponding to different importance levels in the computing workload running thereon, the processing capacity consumption being measured in millions of service units per hour (MSUs);

determining a four-hour rolling average (4HRA) of processing capacity consumption by each of the system usage entities;

allocating a dynamic entitlement MSU amount for each of the system usage entities to be the greater of (1) all the MSUs that the system usage entity needs to complete high importance work, and (2) a predetermined fraction of the 4HRA of the system usage entity;

using the allocated dynamic entitlements as capping limits in conjunction with a capping product or solution for regulating processing capacity consumption by each of the system usage entities when running their respective computing workloads; and limiting the allocated dynamic entitlement MSU amount for each of the system usage entities to be no greater than the static entitlement of the system usage entity by combining, in an excess MSU pool, unused MSUs from the sum of the static entitlements that have not been allocated toward dynamic entitlements, and allocating additional MSU amounts out of the excess MSU pool toward the dynamic entitlements of the system usage entities, one-by-one, in one or more iterative loops, wherein allocating additional MSU amounts out of the excess MSU pool includes:

for each of the system usage entities, determining a low-importance workload percentage (LIWP) as the percentage of standard central processing unit (CPU) consumption of service class periods having low importance over the consumption of all service class periods;

determining an adjusted low-importance workload percentage (ALIWP) by adjusting the LIWP upward or downward according to a priority associated with the system usage entity; and in each iterative loop, beginning allocating additional MSU amounts with the system usage entity having the lowest ALIWP, proceeding to the system usage entity having the next higher ALIWP, and ending with the system usage entity having the highest ALIWP.

2. The method of claim 1, wherein the predetermined faction of the 4HRA is one half.

3. The method of claim 1, wherein determining a low-importance workload percentage (LIWP) includes determining the percentage using an IBM Workload Manager service (IWMRCOLL) available on the mainframe computer system for workload activity collection.

4. The method of claim 1 further comprising:

for each of the system usage entities, determining a high-importance workload percentage (HIWP) as the percentage of standard CPU consumption of service class periods having high importance over the consumption of all service class periods;

determining a percentage of the 4HRA MSUs consumed by each of the system usage entities for high importance work as (HIWP*4HRA); and when the percentage of the 4HRA MSUs consumed by the system usage entity for high importance work HIWP*4HRA is greater than dynamic entitlement MSU amount for the system usage entity, in a first iterative loop, allocating additional MSU amounts out of the excess MSU pool to increase the dynamic entitlement for the system usage entity to equal HIWP*4HRA.

5. The method of claim 4 further comprising:

when there still are unused MSUs left in the excess MSU pool after the first iterative loop, in a second iterative loop, allocating additional MSU amounts out of the excess MSU pool to increase the dynamic entitlement for a system usage entity by an amount based on a percentage of the 4HRA MSU consumption of the system usage entity.

6. The method of claim 5, wherein the amount based on the percentage of the 4HRA MSU consumption of the system usage entity is (1% 4HRA+1) MSUs rounded to the next highest integer.

7. The method of claim 5 further comprising:

when there still are unused MSUs left in the excess MSU pool after the second iterative loop, in a third iterative loop, allocating additional MSU amounts out of the excess MSU pool to increase the dynamic entitlement for a system usage entity by a fixed number of MSUs.

8. The method of claim 1, wherein using the allocated dynamic entitlements as capping limits in conjunction with a capping product for regulating processing capacity consumption by each of the system usage entities when running their respective computing workloads includes using the allocated dynamic entitlements as capping limits below a preset maximum capacity limit for a combined processing capacity consumption of the system usage entities.

9. A capping product for regulating computing workloads on a group of system usage entities of a mainframe computer system, each of the system usage entities including a logical partition (LPAR) or a group of LPARs, each of the system usage entities having a static processing capacity entitlement for running a computing workload thereon, the computing workload having different portions of work corresponding to different importance levels, the different importance levels ranging from low importance levels to high importance levels that are user assigned, the capping product comprising a non-transitory computer-readable medium storing instructions which when executed by one or more processors cause the computer system to:

for each of the system usage entities, determine consumption of processing capacity by the different portions of work corresponding to different importance levels in the computing workload running thereon, the processing capacity consumption being measured in millions of service units per hour (MSUs);

determine a four-hour rolling average (4HRA) of processing capacity consumption by each of the system usage entities;

allocate a dynamic entitlement MSU amount for each of the system usage entities to be the greater of (1) all the MSUs that the system usage entity needs to complete high importance work, and (2) a predetermined fraction of the 4HRA of the system usage entity;

use the allocated dynamic entitlements as capping limits in conjunction with a capping product or solution for regulating processing capacity consumption by each of the system usage entities when running their respective computing workloads; and limit the allocated dynamic entitlement MSU amount for each of the system usage entities to be no greater than the static entitlement of the system usage entity by combining, in an excess MSU pool, unused MSUs from the sum of the static entitlements that have not been allocated toward dynamic entitlements, and allocating additional MSU amounts out of the excess MSU pool toward the dynamic entitlements of the system usage entities, one-by-one, in one or more iterative loops, wherein allocating additional MSU amounts out of the excess MSU pool includes:

for each of the system usage entities, determining a low-importance workload percentage (LIWP) as the percentage of standard central processing unit (CPU) consumption of service class periods having low importance over the consumption of all service class periods;

determining an adjusted low-importance workload percentage (ALIWP) by adjusting the LIWP upward or downward according to a priority associated with the system usage entity; and in each iterative loop, beginning allocating additional MSU amounts with the system usage entity having the lowest ALIWP, proceeding to the system usage entity having the next higher ALIWP, and ending with the system usage entity having the highest ALIWP.

10. The capping product of claim 9, wherein the predetermined fraction of the 4HRA is one half.

11. The capping product of claim 9, wherein the instructions when executed by the one or more processors further cause the computer system to determine the percentage of high-importance work by using a Multiple Virtual Storage (MVS) service named "IWMRCOLL" available on the mainframe computer system.

12. The capping product of claim 9, wherein the instructions when executed by the one or more processors further cause the computer system to:

for each of the system usage entities, determine a high-importance workload percentage (HIWP) as the percentage of standard CPU consumption of service class periods having high importance over the consumption of all service class periods;

determine a percentage of the 4HRA MSUs consumed by each of the system usage entities for high importance work as (HIWP*4HRA); and when the percentage of the 4HRA MSUs consumed by the system usage entity for high importance work HIWP*4HRA is greater than dynamic entitlement MSU amount for the system usage entity, in a first iterative loop, allocate additional MSU amounts out of the excess MSU pool to increase the dynamic entitlement for the system usage entity to equal HIWP*4HRA.

13. The capping product of claim 12, wherein the instructions when executed by the one or more processors further cause the computer system to:

when there still are unused MSUs left in the excess MSU pool after the first iterative loop, in a second iterative loop, allocate additional MSU amounts out of the excess MSU pool to increase the dynamic entitlement for a system usage entity by an amount based on a percentage of the 4HRA MSU consumption of the system usage entity.

14. The capping product of claim 13, wherein the amount based on the percentage of the 4HRA MSU consumption of the system usage entity is (1% 4HRA+1) MSUs rounded to the next highest integer.

15. The capping product of claim 13, wherein the instructions when executed by the one or more processors further cause the computer system to:

when there still are unused MSUs left in the excess MSU pool after the second iterative loop, in a third iterative loop, allocating additional MSU amounts out of the excess MSU pool to increase the dynamic entitlement for a system usage entity by a fixed number of MSUs.

16. The capping product of claim 9, wherein the instructions when executed by the one or more processors further cause the computer system to:

regulate processing capacity consumption by the system usage entities when running their respective computing workloads by using the allocated dynamic entitlements as capping limits below a preset maximum capacity limit.

17. A mainframe computing system comprising:
a central processor complex;
a plurality of system usage entities, each of the system usage entities being a logical partition or a group of logical partitions of the mainframe computing system, each of the system usage entities having a static entitlement of mainframe processing capacity;
a workload manager that schedules work requested by the plurality of system usage entities on the central processor complex and tracks, by system usage entity, consumption of the mainframe processing capacity by a computing workload running on the system usage entity;
a dynamic capping policy for the central processor complex stored in non-transitory memory, the dynamic capping policy identifying:
a maximum processing capacity limit,
a subset of the plurality of system usage entities, and
for each of the identified system usage entities, information from which to determine a dynamically varying entitlement value of mainframe processing capacity for each of the system usage entities on which a computing workload is being executed; and
a dynamic capping master configured to:
for each of the identified system usage entities, determine consumption of processing capacity by the different portions of work corresponding to different importance levels in the computing workload running thereon, the different importance levels ranging from low importance levels to high importance levels that are user assigned, the processing capacity consumption being measured in millions of service units per hour (MSUs);
determine a four-hour rolling average (4HRA) of processing capacity consumption by each of the identified system usage entities;
allocate a dynamic entitlement MSU amount for each of the identified system usage entities to be the greater of (1) all the MSUs that the system usage entity needs to complete high importance work, and (2) a predetermined fraction of the 4HRA of the system usage entity;
use the allocated dynamic entitlements as capping limits for regulating processing capacity consumption by each of the system usage entities when running their respective computing workloads; and
limit the allocated dynamic entitlement MSU amount for each of the identified system usage entities to be no greater than the static entitlement of the system usage entity by combining, in an excess MSU pool, unused MSUs from the sum of the static entitlements that have not been allocated toward dynamic entitlements, and allocating additional MSU amounts out of the excess MSU pool toward the dynamic entitlements of the system usage entities, one-by-one, in one or more iterative loops,
wherein allocating additional MSU amounts out of the excess MSU pool includes:
for each of the identified system usage entities, determining a low-importance workload percentage (LIWP) as the percentage of standard central processing unit (CPU) consumption of service class periods having low importance over the consumption of all service class periods;
determining an adjusted low-importance workload percentage (ALIWP) by adjusting the LIWP upward or downward according to a priority associated with the system usage entity; and
in each iterative loop, beginning allocating additional MSU amounts with the system usage entity having the lowest ALIWP, proceeding to the system usage entity having the next higher ALIWP, and ending with the system usage entity having the highest ALIWP.

18. The mainframe computing system of claim 17, wherein the predetermined fraction of the 4HRA is one half.

19. The mainframe computing system of claim 17, wherein the dynamic capping master is configured to:
for each of the identified system usage entities, determine a high-importance workload percentage (HIWP) as the percentage of standard CPU consumption of service class periods having high importance over the consumption of all service class periods;
determine a percentage of the 4HRA MSUs consumed by each of the identified system usage entities for high importance work as (HIWP*4HRA); and
when the percentage of the 4HRA MSUs consumed by the system usage entity for high importance work HIWP*4HRA is greater than dynamic entitlement MSU amount for the system usage entity, in a first iterative loop, allocate additional MSU amounts out of the excess MSU pool to increase the dynamic entitlement for the system usage entity to equal HIWP*4HRA.

20. The mainframe computing system of claim 17, wherein the dynamic capping master is configured to:
when there still are unused MSUs left in the excess MSU pool after the first iterative loop, in a second iterative loop, allocate additional MSU amounts out of the excess MSU pool to increase the dynamic entitlement for a system usage entity by an amount based on a percentage of the 4HRA MSU consumption of the system usage entity.

21. The mainframe computing system of claim 20, wherein the amount based on the percentage of the 4HRA MSU consumption of the system usage entity is (1% 4HRA+1) MSUs rounded to the next highest integer.

22. The mainframe computing system of claim 20, wherein the dynamic capping master is configured to:
when there still are unused MSUs left in the excess MSU pool after the second iterative loop, in a third iterative loop, allocate additional MSU amounts out of the excess MSU pool to increase the dynamic entitlement for a system usage entity by a fixed number of MSUs.

23. The mainframe computing system of claim 17, wherein the dynamic capping master is configured to:
regulate processing capacity consumption by the system usage entities when running their respective computing workloads by using the allocated dynamic entitlements as capping limits below a preset maximum capacity limit for a combined processing capacity consumption of the system usage entities.

* * * * *

UNITED STATES PATENT AND TRADEMARK OFFICE
CERTIFICATE OF CORRECTION

PATENT NO. : 9,846,600 B1  
APPLICATION NO. : 15/452309  
DATED : December 19, 2017  
INVENTOR(S) : Williams et al.

Page 1 of 1

It is certified that error appears in the above-identified patent and that said Letters Patent is hereby corrected as shown below:

In Column 19, Line 16, Claim 2, delete "faction" and insert -- fraction --, therefor.

Signed and Sealed this
Eighteenth Day of September, 2018

Andrei Iancu
*Director of the United States Patent and Trademark Office*